US010041351B2

(12) United States Patent
Zollinger et al.

(10) Patent No.: US 10,041,351 B2
(45) Date of Patent: *Aug. 7, 2018

(54) TURBOCHARGER SHAFT AND WHEEL ASSEMBLY

(71) Applicant: Honeywell International Inc., Morristown, NJ (US)

(72) Inventors: Brent Zollinger, Bellflower, CA (US); Maurizio Barbone, Atessa (IT); Didier Horlaville, Laneuveville-devant-Nancy (FR); Andrei Minculescu, Bucharest (RO); Nicolas Vazeille, Bainville-aux-Miroirs (FR)

(73) Assignee: Honeywell International Inc., Morris Plains, NJ (US)

( * ) Notice: Subject to any disclaimer, the term of this patent is extended or adjusted under 35 U.S.C. 154(b) by 843 days.

This patent is subject to a terminal disclaimer.

(21) Appl. No.: 14/488,112

(22) Filed: Sep. 16, 2014

(65) Prior Publication Data

US 2016/0076556 A1    Mar. 17, 2016

(51) Int. Cl.
*B23K 26/03*  (2006.01)
*B23K 26/06*  (2014.01)
(Continued)

(52) U.S. Cl.
CPC ............ *F01D 5/063* (2013.01); *B23K 26/032* (2013.01); *B23K 26/034* (2013.01);
(Continued)

(58) Field of Classification Search
CPC . F01D 5/025; F01D 5/063; F02C 6/12; B23K 26/0617; B23K 26/0619;
(Continued)

(56) References Cited

U.S. PATENT DOCUMENTS

| 4,063,062 A | 12/1977 | Kuhnen |
| 4,794,231 A * | 12/1988 | Banas ................ B23K 26/0604 |
| | | 219/121.63 |

(Continued)

FOREIGN PATENT DOCUMENTS

| CN | 101 480 760 A | 7/2009 |
| CN | 103 438 058 A | 12/2013 |

(Continued)

OTHER PUBLICATIONS

Machine translation of JP 2012061496 (Mar. 29, 2012) from Espacenet.*

(Continued)

*Primary Examiner* — Jason Shanske
*Assistant Examiner* — Christopher R Legendre
(74) *Attorney, Agent, or Firm* — Brian J. Pangrle

(57) ABSTRACT

A unit for a turbocharger can include a turbine wheel portion that includes a turbine wheel material and a turbine wheel axis; a shaft portion that includes a shaft material and a shaft axis; a first weld that includes a first average axial position over a first azimuthal span and first weld composition formed of a greater proportion of the turbine wheel material than the shaft material; and a second weld that includes a second average axial position over a second azimuthal span and second weld composition formed of a greater proportion of the turbine wheel material than the shaft material, where a sum of the first azimuthal span and the second azimuthal span is approximately 360 degrees, where the first average axial position differs from the second average axial position, and where the first weld composition differs from the second weld composition.

20 Claims, 11 Drawing Sheets

(51) Int. Cl.
*B23K 26/067* (2006.01)
*B23K 26/28* (2014.01)
*F01D 5/02* (2006.01)
*F01D 5/06* (2006.01)
*F02C 6/12* (2006.01)
*B23K 103/04* (2006.01)
*B23K 103/18* (2006.01)
*B23K 101/00* (2006.01)

(52) U.S. Cl.
CPC ...... *B23K 26/0604* (2013.01); *B23K 26/0673* (2013.01); *B23K 26/28* (2013.01); *F01D 5/025* (2013.01); *F02C 6/12* (2013.01); *B23K 2201/001* (2013.01); *B23K 2203/04* (2013.01); *B23K 2203/26* (2015.10); *F05D 2200/25* (2013.01); *F05D 2220/40* (2013.01); *F05D 2230/232* (2013.01); *F05D 2230/234* (2013.01); *F05D 2300/16* (2013.01)

(58) Field of Classification Search
CPC ...... B23K 26/28; B23K 26/282; B23K 26/24; B23K 2201/001; B23K 2203/04; B23K 2203/26; F05D 2220/40; F05D 2230/232
USPC .................................................. 219/212.64
See application file for complete search history.

(56) References Cited

U.S. PATENT DOCUMENTS

| | | | |
|---|---|---|---|
| 4,983,064 A | 1/1991 | Kawaguchi et al. | |
| 5,248,078 A | 9/1993 | Deal | |
| 5,651,903 A | 7/1997 | Shirk | |
| 6,291,086 B1 | 9/2001 | Nguyen-Dinh | |
| 6,563,074 B2 * | 5/2003 | Bazukuri | F01D 5/025 219/121.14 |
| 6,848,180 B2 | 2/2005 | Shimizu | |
| 6,948,913 B2 | 9/2005 | Heyes et al. | |
| 7,156,282 B1 | 1/2007 | Renaud et al. | |
| 7,287,960 B2 | 10/2007 | Decker | |
| 8,513,841 B2 | 8/2013 | Rotzinger | |
| 9,044,833 B2 * | 6/2015 | Holzschuh | B23P 15/006 |
| 9,109,449 B2 * | 8/2015 | Shige | B23K 35/30 |
| 2005/0109745 A1 | 5/2005 | Wessner | |
| 2005/0139640 A1 | 6/2005 | Kay | |
| 2006/0067824 A1 * | 3/2006 | O'Hara | F01D 5/026 416/170 R |
| 2006/0231531 A1 * | 10/2006 | Burnett | B23K 15/04 219/121.14 |
| 2006/0279731 A1 | 12/2006 | Beyer | |
| 2008/0211339 A1 | 9/2008 | Rotzinger | |
| 2009/0050612 A1 | 2/2009 | Serruys | |
| 2010/0003132 A1 | 1/2010 | Holzschuh | |
| 2010/0154214 A1 | 6/2010 | Hsu et al. | |
| 2010/0183112 A1 | 7/2010 | Ashida | |
| 2012/0076639 A1 | 3/2012 | Vazeille et al. | |
| 2012/0097645 A1 | 4/2012 | Clark | |
| 2012/0188365 A1 | 7/2012 | Stork | |
| 2013/0272781 A1 * | 10/2013 | Oiwa | B23K 26/0823 403/271 |
| 2014/0154693 A1 | 6/2014 | Nishimoto | |
| 2015/0104318 A1 * | 4/2015 | Koch | B23K 1/0018 416/213 R |
| 2015/0159487 A1 * | 6/2015 | Thirion | B23K 37/06 416/213 R |
| 2016/0076377 A1 * | 3/2016 | Zollinger | F01D 5/063 60/605.1 |
| 2016/0076556 A1 * | 3/2016 | Zollinger | F04D 29/626 60/605.1 |

FOREIGN PATENT DOCUMENTS

| | | |
|---|---|---|
| DE | 10 2007 059262 A1 | 6/2009 |
| DE | 10 2008 046945 A1 | 3/2010 |
| DE | 10 2012 201353 A1 | 8/2013 |
| DE | 10 2012 205042 A1 | 10/2013 |
| EP | 1134385 B1 | 10/2006 |
| EP | 1712324 A1 | 10/2006 |
| EP | 1719572 A2 | 11/2006 |
| EP | 1964641 A1 | 9/2008 |
| EP | 2065564 A2 | 6/2009 |
| EP | 2 206 798 A1 | 7/2010 |
| EP | 2 434 126 A2 | 3/2012 |
| EP | 2434126 A2 | 3/2012 |
| EP | 2065564 A3 | 5/2012 |
| EP | 2 617 512 A1 | 7/2013 |
| EP | 2617512 A1 | 7/2013 |
| JP | 61152902 A | 7/1986 |
| JP | 7286528 A | 10/1995 |
| JP | H08 90233 A | 4/1996 |
| JP | 2007205253 A | 8/2007 |
| JP | 2011-112039 A | 6/2011 |
| JP | 2011-117540 A | 6/2011 |
| JP | 2011208620 A * | 10/2011 |
| JP | 2012 061496 A | 3/2012 |
| JP | 2012057577 A | 3/2012 |
| JP | WO 2012036147 A1 * | 3/2012 ......... B23K 26/0823 |
| JP | 2013177850 A * | 9/2013 ............... C21D 9/50 |
| WO | 2010/036425 A2 | 4/2010 |

OTHER PUBLICATIONS

EP Application No. 15184376.9-1610 / 3006157, ESR and Exam Report dated Apr. 25, 2016 (11 pages).

EP Application No. 15185375.1-1610 / 2998505, Extended European Search Report dated Jun. 8, 2016 (10 pages).

Primes, Power Measuring Module, Instructions, Revision May 2012 (36 pages).

Kuo et al., Effects of Different Shielding Gases and Power Waveforms on Penetration Characteristics and Porosity Formation in Laser Welding of Inconel 690 Alloy, Materials Transactions, vol. 48, No. 2 (2007) pp. 219-226 (8 pages).

Hussein et al., The role of laser wavelength on plasma generation and expansion of adiabatic plumes in air, Journal of Applied Physics, 113, 143305 (2013), pp. 143305-1 to 143305-10 (10 pages).

Joesph et al., Weld metal characterization of 316L(N) austenitic stainless steel by electron beam welding process, International Journal of Engineering, Science and Technology, vol. 4, No. 2, 2012, pp. 169-176 (8 pages).

Apostol et al., Input parameters influence on the residual stress and distortions at laser welding using finite element analysis, U.P.B. Sci. Bull., Series D, vol. 74, Iss. 2, 2012, pp. 153-164 (12 pages).

Haynes International, Fabrication of Hastelloy Corrosion-Resistant Alloys, 2003 (40 pages).

Rao et al., Study on effect of welding speed on micro structure and mechanical properties of pulsed current micro plasma arc welded Inconel 625 sheets, Journal of Minerals and Materials Characterization and Engineering, 2012, 11, 1027-1033, Oct. 2012 (7 pages).

BOC, Linde Group, Laser welding. Laserline Technical, 2009 (11 pages).

Glickstein et al., Technical Note: Effect of weld pool configuration on heat-affected zone shape, Welding Journal, Welding Research Supplement, pp. 110-s to 112-s, Jun. 1981 (3 pages).

Weeter et al., Development of a weldability test for pulsed laser beam welding, Welding Journal, Welding Research Supplement, pp. 51-s to 62-s, Mar. 1986 (12 pages).

Lugscheider et al. Thermal and Metallurgical Influences on AISI 216 and Inconel 625 by High Temperature Brazing with Nickel Base Filler Metals, Welding Journal, Welding Research Supplement, Oct. 1982, pp. 329-s to 333-s (5 pages).

EP Application No. 14192572.7-1610, Search Report dated Apr. 8, 2015 (7 pages).

EP Application No. 15184959.2-1607 Apr. 24, 2018, ESR and Exam Report dated Feb. 10, 2016 (8 pages).

EP Application No. 15185375.1-1610 Apr. 24, 2018, ESR dated Feb. 10, 2016 (8 pages).

(56) References Cited

OTHER PUBLICATIONS

EP Application No. 15185294.4-1610 Apr. 24, 2018, ESR and Exam Report dated Feb. 11, 2016 (8 pages).

\* cited by examiner

Sensors and Sensor Information 910

| Sensor | Wavelength | Information |
|---|---|---|
| Plasma (or metal plume) | UV, < ~ 600 nm | Power, Focus, Gas, Seam, Weld Gap, Etc. |
| Temperature | NIR, ~ 1100 - ~1800 nm | Δ Heat Dissipation, Porosity, Penetration, Etc. |
| Back Reflection | Laser Wavelength (e.g., ~ 1020 - ~ 1160 nm) | Keyhole, Depth, Splatter, Etc. |
| Visible | ~ 390 - ~ 700 nm | Size, Shape, Surface, Seam, Etc. |

TURBOCHARGER SHAFT AND WHEEL ASSEMBLY

TECHNICAL FIELD

Subject matter disclosed herein relates generally to turbomachinery for internal combustion engines and, in particular, to turbochargers.

BACKGROUND

Turbochargers are frequently utilized to increase output of an internal combustion engine. A turbocharger can include a turbine wheel welded to a shaft to form a shaft and wheel assembly (SWA). A SWA may be rotatably supported by a bearing or bearings to rotate at high rotational speeds. Various examples of techniques, technologies, etc. described herein pertain to turbocharger shaft and wheel assemblies.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
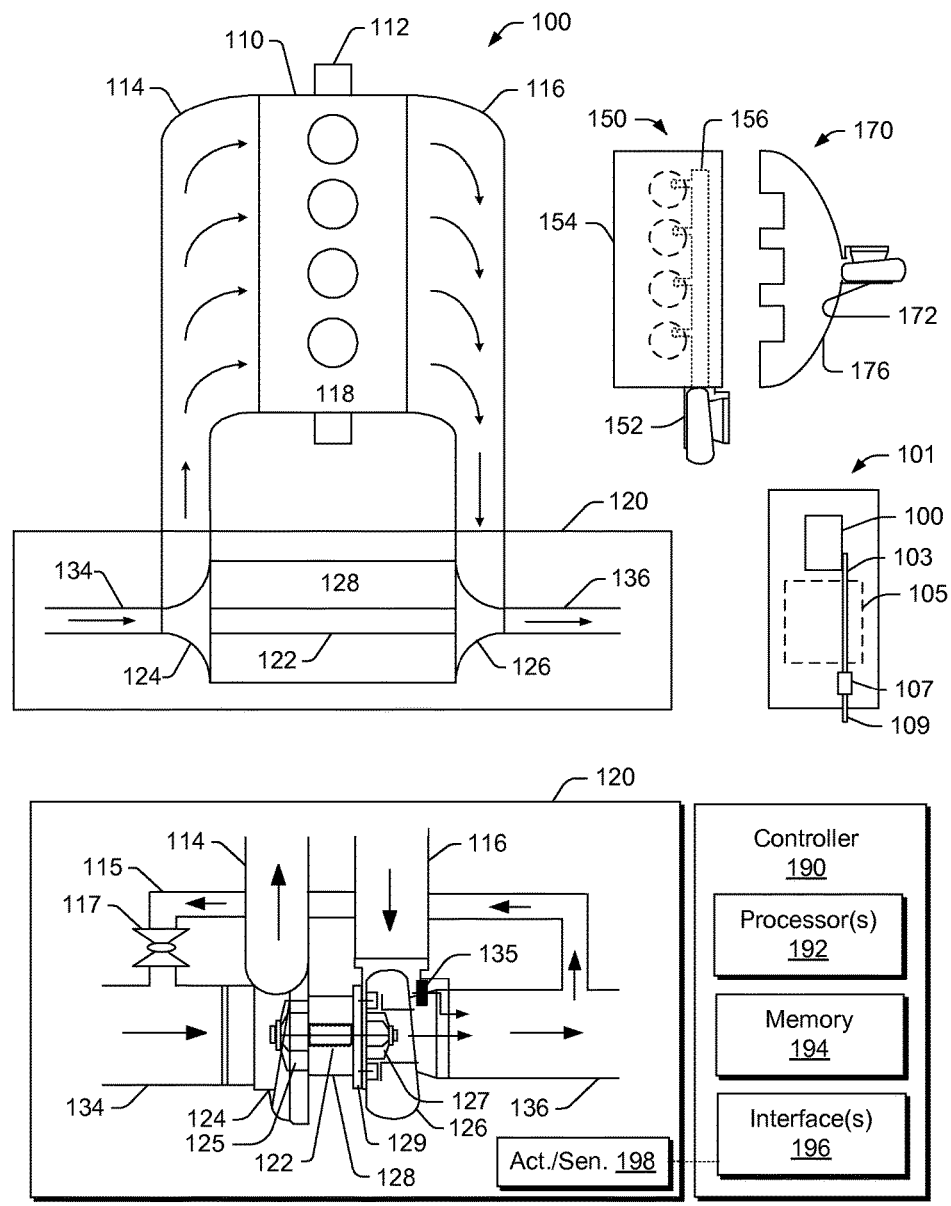
FIG. 1 is a diagram of an example of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
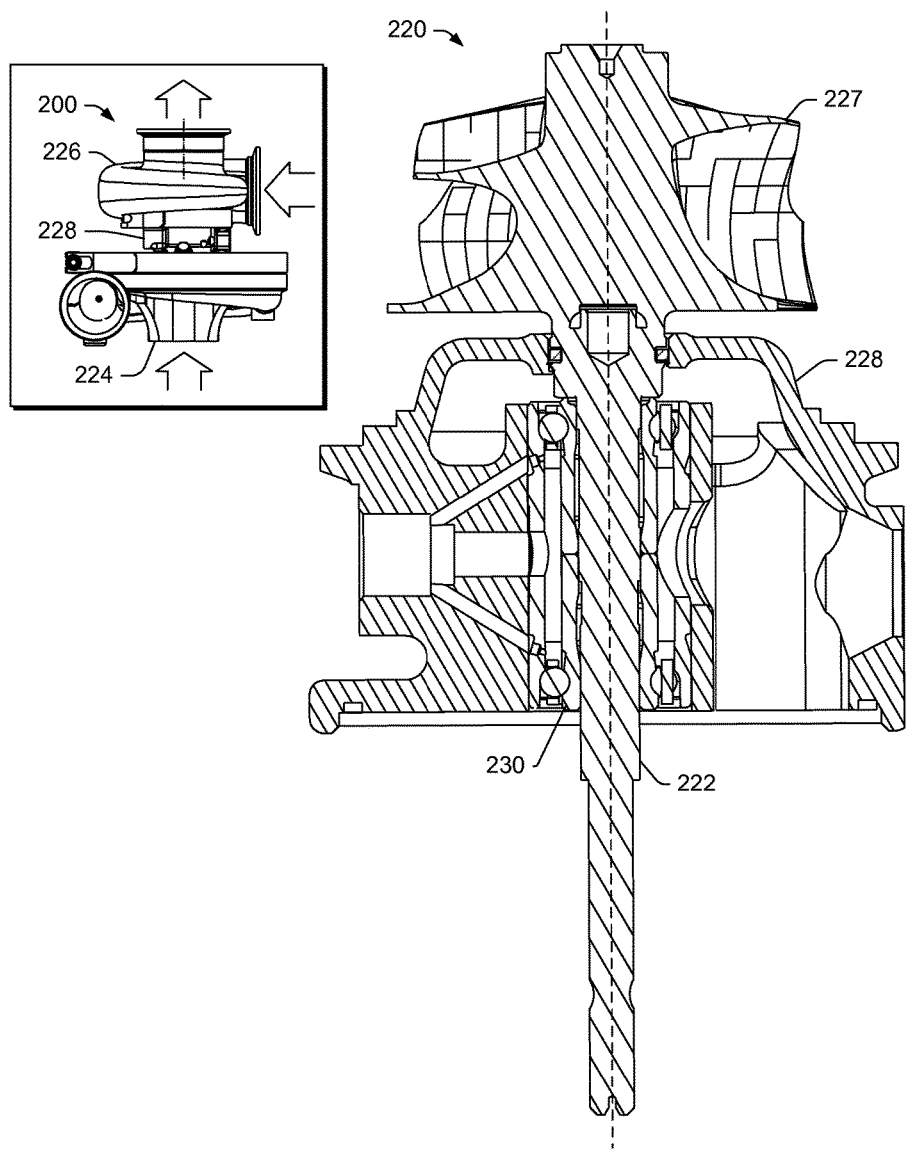
FIG. 2 is a diagram of an example of a turbocharger and a cross-sectional view of a portion of the turbocharger.

FIG. 2 shows an example of a turbocharger 200 that includes a compressor housing 224, a turbine housing 226 and a center housing 228. In a cross-sectional view of a portion of the turbocharger 200, a shaft and turbine wheel assembly (SWA) 220 is shown that includes a shaft 222 and a turbine wheel 227 that have been welded to form a unit (e.g., an SWA unit). In the example of FIG. 2, the center housing 228 includes a through bore that receives a bearing assembly 230 that rotatably supports the SWA 220. In the example of FIG. 2, the bearing assembly 230 includes an outer race, an inner race and rolling elements (e.g., balls) disposed between the outer and inner races; noting that a turbocharger may include one or more other types of bearings/bearing assemblies (e.g., consider a journal bearing, etc.). In the example of FIG. 2, the center housing 228 includes lubricant passages that can direct lubricant to the bearing assembly 230, for example, to lubricate rolling elements, and direct lubricant to surfaces within the center housing 228, for example, to form lubricant films (e.g., squeeze films, etc.).

In the example of FIG. 2, the SWA 220 includes an annular recess that seats a seal element such as, for example, a piston ring (e.g., or piston rings). These features may align with a bore surface of the center housing 228 and act to resist flow of exhaust from the turbine housing 226 to a cavity of the center housing 228 and flow of lubricant from the cavity of the center housing 228 to the turbine housing 226.

As mentioned, a shaft may be joined to a turbine wheel by welding. As an example, a joining process may act to minimize initial unbalance (e.g., distortion) and balance migration (e.g., non-symmetric residual stresses).

As an example, a system can include one or more units that can emit laser beams where each of the beams carries energy sufficient to form a weld between a shaft and a turbine wheel. As an example, consider a system that can emit two or more laser beams that may be symmetrically oriented with respect to a cylindrical workpiece so that tacking or welding can be accomplished, for example, in a synchronized manner. In such an example, the system may act to minimize distortion from pull-back of a weld spot or weld spots.

As operational environments of a compressor wheel, a shaft and a turbine wheel differ, materials of construction and manners of construction of these components can also differ. For example, exhaust temperatures may exceed 500 degrees C. for a diesel engine and 1000 degrees C. for a gasoline engine thereby requiring high-temperature materials for turbine wheel construction. Further, while a shaft may be made of a moderate temperature resistant metal or metal alloy turned on a lathe, etc., a turbine wheel may be cast using a high-temperature resistant ceramic, metal or metal alloy (e.g., consider austenitic nickel-chromium-based superalloys marketed under the brand INCONEL®, Special Metals Corporation, Huntington W. Va.).

INCONEL® alloys are predominantly nickel followed by chromium. For example, INCONEL® 625 is about 60 percent nickel, about 20 percent chromium, about 8 percent molybdenum, about 5 percent iron and the remainder other metals. Welding of INCONEL® alloys can present issues such as cracking and microstructural segregation of alloying elements in a heat-affected zone.

As an example, a turbocharger SWA can include a shaft portion made of a first material and a turbine wheel portion made of a second, different material. In such an example, welding involves forming a weld with two different materials. As an example, where a filler material is included at a joint prior to welding, yet another material may be present.

Beam-based welding causes weld pool formation, which is followed by weld pool solidification. Various factors can influence weld characteristics. As an example, factors associated with a joint (e.g., joint interface) of dissimilar alloys can influence cracking. As another example, factors associated with a beam (e.g., continuous versus pulsed) can influence cracking.

Beam-based welding can generate a plasma plume, which includes ionized metal vapor. Plasma plume dynamics may exist, for example, where a recoil pressure may be exerted on a weld pool (e.g., which may act to flatten or otherwise shape a weld pool). As an example, increases in plasma plume intensity may also act to increase spatter ejection.

As an example, a system can include equipment to measure one or more characteristics of a plasma plume (e.g., size, height, chemical composition, etc.). As an example, a system can include equipment to relate one or more plasma characteristics to one or more welding parameters, for example, to control welding based at least in part on plasma plume analysis.

As an example, a system may employ keyhole welding. Keyhole welding may employ a beam with sufficient energy to penetrate into material, for example, to form a cavity filled with ionized metal vapor. A keyhole welding system may implement a laser unit that can generate a beam with a power density in excess of about 100,000 W/mm$^2$ (e.g., about $10^5$ W/mm$^2$). Such a level of power density may melt and partly vaporize workpiece material (e.g., or materials). Pressure of the generated vapor can displace molten material so that a cavity is formed (e.g., a keyhole). Inside a cavity, the absorption rate of laser radiation can increase due to multiple reflections in the cavity. For example, where the beam hits the wall of the cavity, a part of the beam energy can be absorbed by the material. Keyhole welding may be suitable for forming welds with depths greater than about 5 mm.

As mentioned, welding may form a plasma or plasma plume. For example, during penetration laser welding, temperature in a cavity (e.g., a keyhole) may rise to a level sufficient to ionize metal vapor. As a plasma may form at and about a weld site, a plasma may absorb a portion of a beam's energy. In such an example, plasma may act as an intermediary in an energy transfer process. As an example, evaporation pressure in a cavity may cause plasma to expand to a region outside of the cavity. In such an example, the plasma may at least partially defocus and scatter a beam, which may lead to a larger focus diameter and a change in the focus position and energy density. As an example, an extended plasma plume or cloud can cause penetration depth to decrease. A weld formed in the presence of a plasma plume may assume, in cross-section, a nail-head shape due at least in part to energy absorption in the plasma plume. If plasma formation is extensive, a welding process may even be interrupted. Plasma may be characterized by an emission of a bluish light. Plasma can include a mixture of metal atoms, ions, electrons and components of a surrounding gas atmosphere. In some instances, plasma may ignite, for example, where argon is used as a welding gas.

As mentioned, a system may include gas handling equipment that can generate, maintain, etc. a local atmosphere at a weld site. Such an atmosphere may effect welding and may optionally be used to tune a welding process. For example, an atmosphere may be controlled with respect to plasma formation, with respect to desired mechanical properties of a weld, with respect to blanketing and/or shielding effect(s), etc. As an example, gas handling equipment may include one or more nozzles that can delivery, aim, etc. gas with respect to one or more sites. As an example, a gas may include one or more of helium, argon, nitrogen, carbon dioxide, oxygen, etc. As an example, a gas may be or include air.

As an example, a gas may be employed that is inert. For example, helium and argon are inert gases that may not react with weld materials. In contrast, other welding gases or welding gas components, such as nitrogen, oxygen and carbon dioxide, may be reactive. A reactive gas may influence weld characteristics. For example, a reactive gas may influence pore formation during beam welding via instability of melt flow in a cavity (e.g., a keyhole). Instability of melt flow may trap vapor and/or welding gas in the form of bubbles that lead to pores upon solidification. As an example, fine-scale porosity may occur when pure nitrogen is used as a welding gas as nitrogen may dissolve into material(s). As the solubility of nitrogen tends to decrease as a material solidifies, gaseous nitrogen can lead to formation of pores. As air includes nitrogen, air may lead to nitrogen-based pores.

As an example, a system may include equipment to perform plume analysis. As an example, a plume may be described with respect time (e.g., along a timeline). For example, at an initial time, a laser beam may be directed at material(s) such that surface absorption and material excitation occur followed by a temperature rise and thermal/non-thermal processes and surface melting. Next, a plasma may form followed by laser/photon reflection, plasma absorption and operation of a "self-regulating" regime. At about a microsecond after beam "impact", a plasma-ambient interaction may occur along with shockwave formation. A plasma may then decelerate and be confined and, thereafter, condense (e.g., at about a millisecond).

As an example, a system may include equipment to perform plume analysis using one or more techniques such as, for example, one or more of shadowgraphy, ICCD fast photography, optical emission spectroscopy, and crater analysis (e.g., using white-light interferometry, etc.). As an example, shadowgraphy and/or fast photography may provide information about hydrodynamic expansion of shock wavefronts and plasma plumes. As an example, optical emission spectroscopy (OES) may provide information about electron number density of plasmas during plume expansion.

Figure 3:
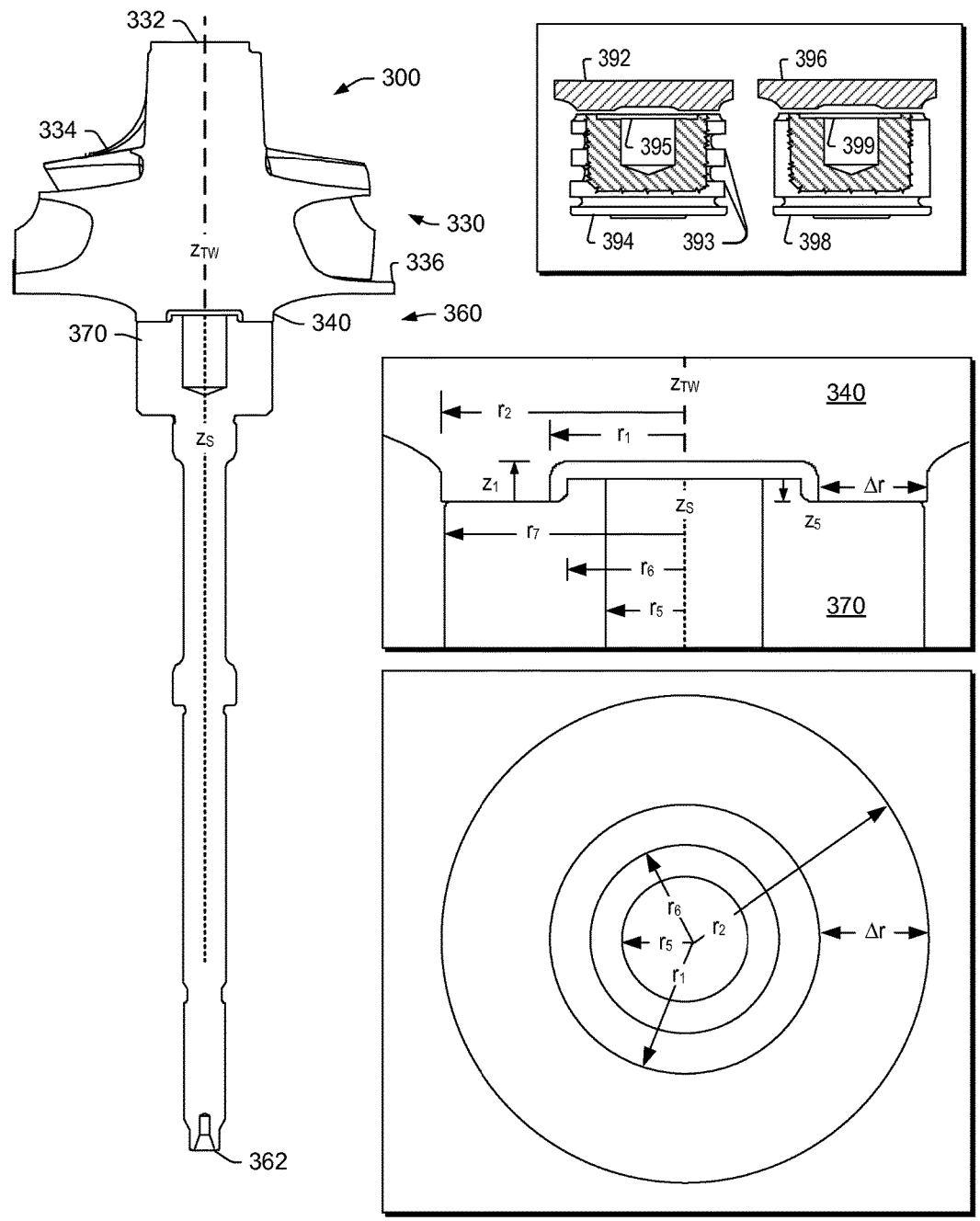
FIG. 3 is a diagram of an example of a shaft and turbine wheel assembly (SWA)

FIG. 3 shows an example of a SWA 300 that includes a turbine wheel 330 and a shaft 360. The turbine wheel 330 includes a nose 332, blades 334, a hub edge 336 and a hub end 340. The shaft 360 includes a compressor wheel end 362 and a turbine wheel end 370. As shown, the hub end 340 of the turbine wheel 330 can form a joint with the turbine wheel end 370 of the shaft 360.

Figure 10:
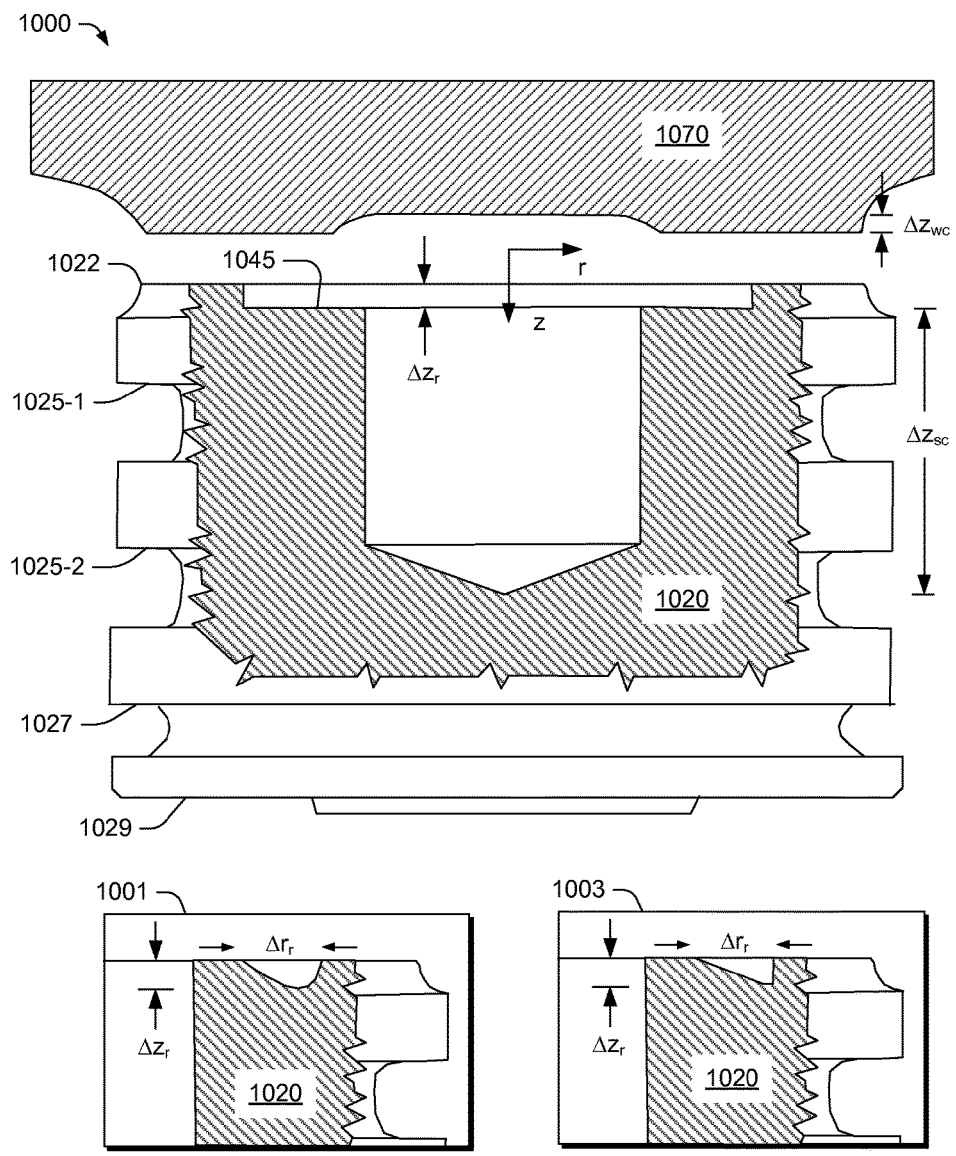
FIG. 10 is a diagram of examples of components.
Figure 11:
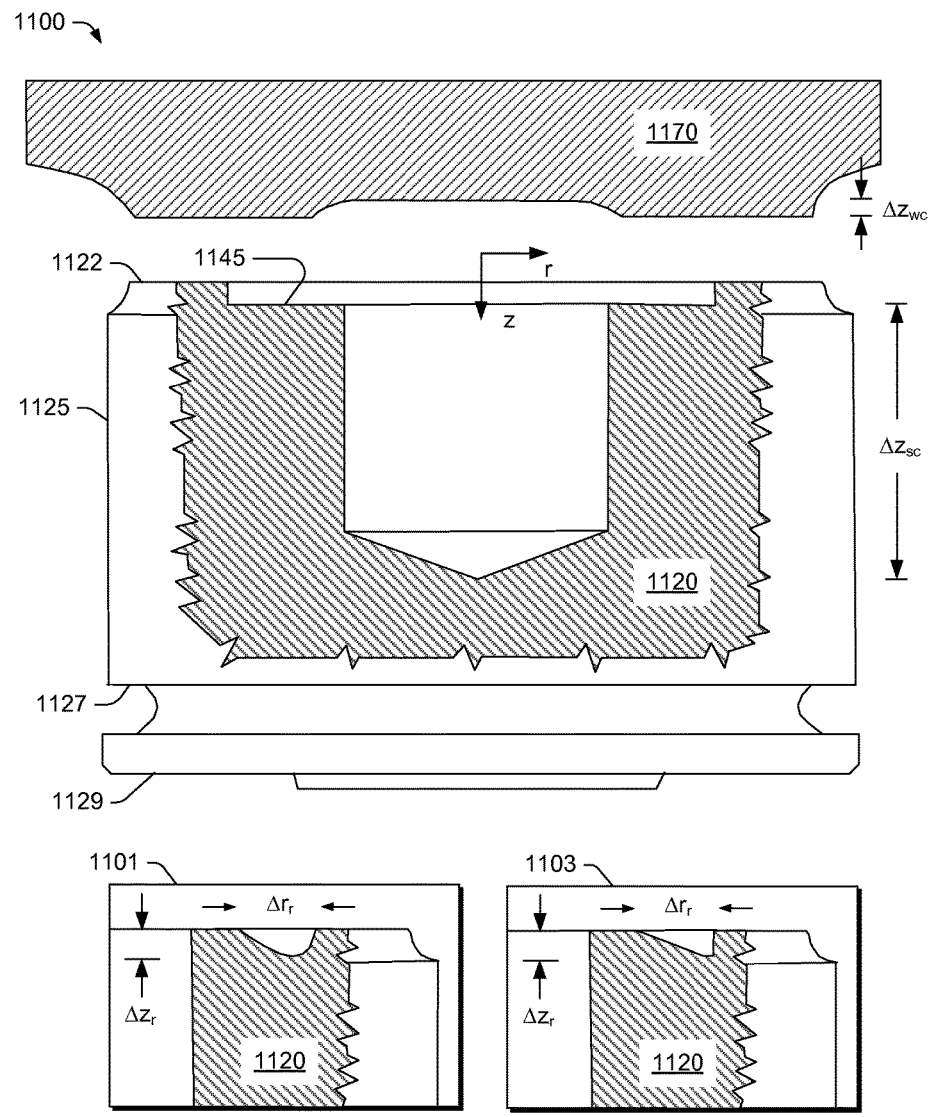
FIG. 11 is a diagram of examples of components.

FIG. 3 also shows an example of a hub end 392 and a turbine wheel end 394 and an example of a hub end 396 and a turbine wheel end 398 (see also, e.g., FIG. 10 and FIG. 11). As illustrated, a shaft may include features such as a recessed weld pool reservoir (e.g., to receive a tip of a weld pool tongue), one or more seal element grooves, etc. For example, the turbine wheel end 394 can include at least one annular grooves 393 and the turbine wheel ends 394 and 398 can each include a recess 395 and 399, respectively, with an axial depth and an outer diameter that may define a reservoir (e.g., a chamber) that can receive spillover, etc. of a weld pool or weld pools upon welding of the components 392 and 394 or the components 396 and 398.

The hub end 340 and the turbine wheel end 370 may be defined with respect to various dimensions, shown in an enlarged cross-sectional view. For example, the hub end 340 includes radial dimensions $r_1$ and $r_2$ measured from a turbine wheel axis $z_{TW}$ and an axial dimension $z_1$ measured from a surface of the hub end 340. The turbine wheel end 370 is shown as including radial dimensions $r_5$, $r_6$ and $r_7$ measured from a shaft axis $z_S$ and an axial dimension $z_5$ measured from a surface of the turbine wheel end 370.

Figure 4:
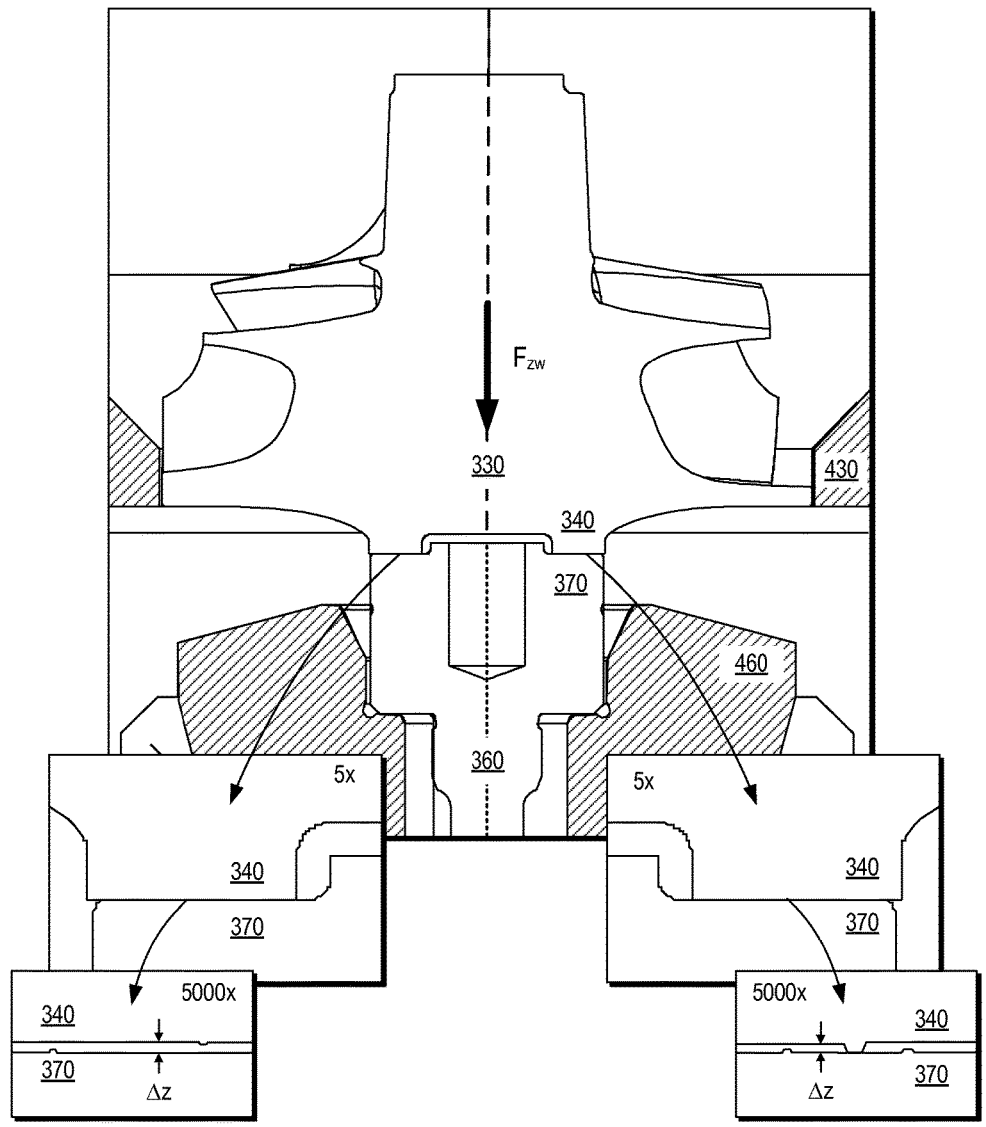
FIG. 4 is a diagram of an example of an assembly.

As an example, a system can include collets that can position the turbine wheel 330 with respect to the shaft 360. For example, FIG. 4 shows an example of an assembly 400 that includes an example of a turbine wheel collet 430 and a shaft collet 460. As shown, the collets 430 and 460 may co-axially locate the turbine wheel 330 and the shaft 360 and may therefore be referred to as centering collets.

As an example, the hub end 340 of the turbine wheel 330 may contact the turbine wheel end 370 of the shaft 360, under the influence of gravity and/or via applied force. In the example of FIG. 4, a line-of-sight gap exists with respect to a joint formed by the hub end 340 of the turbine wheel 330 and the turbine wheel end 370 of the shaft 360. As an example, one or more of the collets 430 and 460 may be rotatable such that, for example, the turbine wheel 330 and the shaft 360 may be rotated in unison. In such an example, a line-of-sight gap may allow for rotation of the turbine wheel 330 and the shaft 360 with respect to a beam or beams that may deliver energy suitable for weld formation to weld the turbine wheel 330 and the shaft 360 to form a SWA (e.g., a SWA unit).

In the example of FIG. 4, clamping may fix an alignment of the axis $z_{TW}$ of the turbine wheel 330 with respect to the axis $z_S$ of the shaft 360 (e.g., to substantially co-axially align $z_{TW}$ and $z_S$). As an example, the turbine wheel 330 may contact the shaft 360. FIG. 4 shows approximate enlarged views where clearances and contacts are illustrated. As an example, the collet 430 may center the turbine wheel 330 in a manner where contact occurs at a single point (see, e.g., the illustration in the lower right).

As an example, upon clamping of the turbine wheel 330 via the collet 430 and/or clamping of the shaft 360 via the collet 460, contact between the turbine wheel 330 and the shaft 360 may be fixed. As an example, a method may include adjusting azimuthal position of the turbine wheel 330 and/or the shaft 360 to achieve a particular type of contact. For example, if a "bump" meets a "bump", rotation of the turbine wheel 330 and/or the shaft 360 may occur to re-position such that the bumps meet plateaus. In such an example, a seam width as defined by the turbine wheel 330 and the shaft 360 may be determined and/or adjusted (see, e.g., $\Delta z$). As indicated, the seam width may depend locally on surface features of the hub end 340 of the turbine wheel 330 and/or surface features of the turbine wheel end 370 of the shaft 360.

Figure 5:
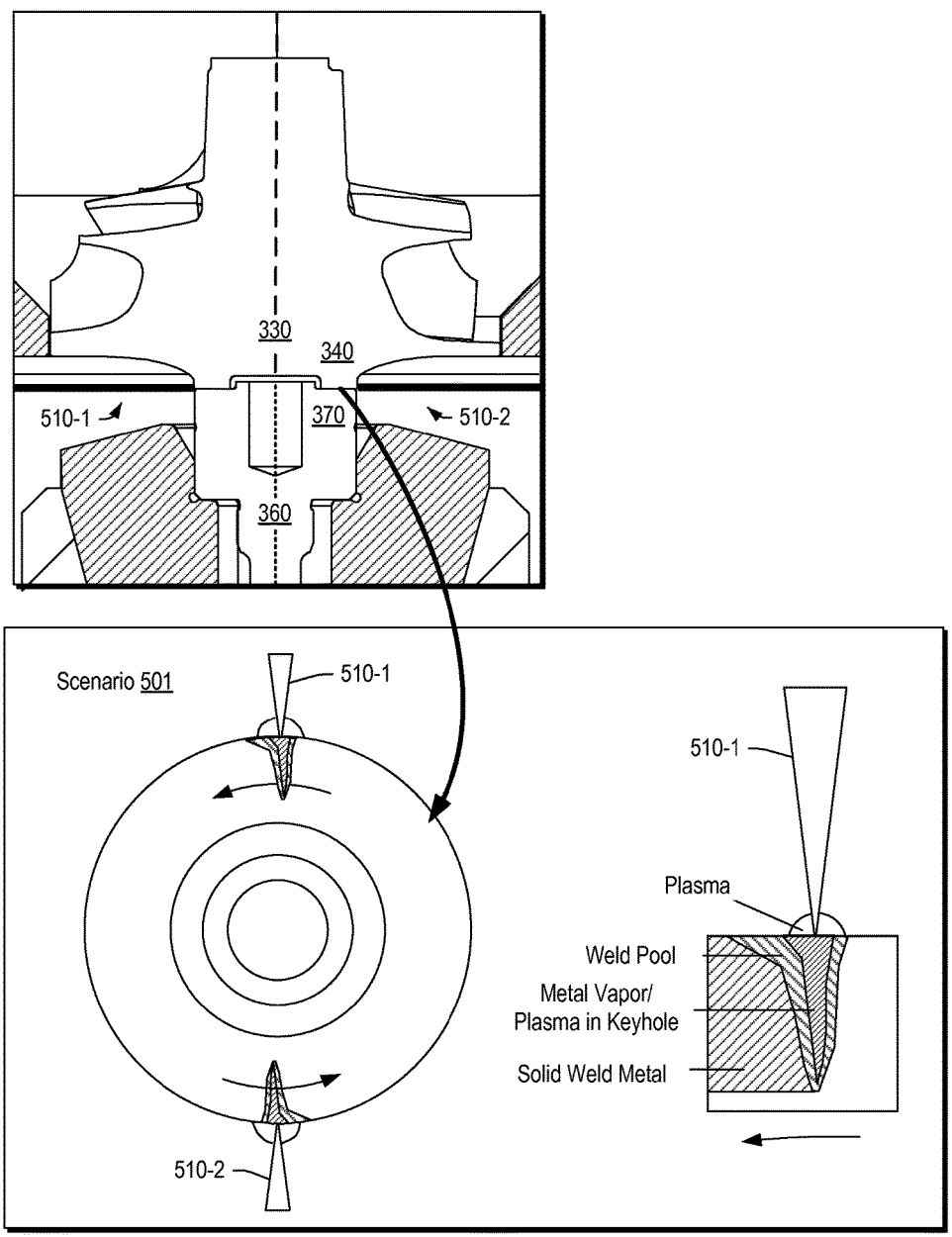
FIG. 5 is a diagram of an example of a welding scenario.

As mentioned, a welding process may include directing one or more beams at or proximate to a joint. FIG. 5 shows a view as in FIG. 4 where laser beams 510-1 and 510-2 are directed at the joint formed by the hub end 340 of the turbine wheel 330 and the turbine wheel end 370 of the shaft 360. In such an example, the beams 510-1 and 510-2 are in a line-of-sight gap where the turbine wheel 330 and the shaft 360 may be rotated in unison such that each of the beams can cover at least a portion of a 360 degree extent of the joint.

As an example, force may be applied in a manner that acts to diminish clearance or clearances at a joint (e.g., a joint interface, a seam, etc.). As an example, a force applicator assembly may be controlled to apply force, optionally in a manner responsive to analysis of a joint (e.g., as to one or more points of contact, clearances, etc.). In such an example, a clearance or clearances may be reduced (e.g., seam width reduction, etc.), for example, to reduce beam penetration depth, etc., which may otherwise create damage inside a joint cavity (e.g., by entering the gap or gaps). As an example, where the turbine wheel 330 is clamped by a collet such as the collet 430, force applied by a force applicator may be transferred to the collet. For example, the collet as clamped to the turbine wheel may travel axially with a turbine wheel.

As an example, a force applicator may be controlled with respect to a minimum force and a maximum force. As an example, a force may be selected and optionally adjusted based at least in part on one or more desired weld characteristics (e.g., for a SWA unit). As an example, a method may include adjusting force during a welding process or welding processes (e.g., which may employ multiple beams). As an example, a maximum force may be based at least in part on limiting run-out level after welding. In such an example, run-out may be caused during welding as a melt mix of materials from two components begins to become weak on a first angular sector such that one component moves axially toward the other component, however, with some amount of inclination (e.g., shrinkage with tilt). While run-out may not impact metallurgy (e.g., weld quality), it impacts SWA geometry.

As an example, a method may include applying a force of about 100 N or less or, for example, a force of about 30 N or less. As an example, a method may include applying force within a range of about 20±10 N. As an example, a method may include monitoring shrinkage, run-out, etc. and adjusting force, for example, during welding. As an example, a method may include sensing tilt of one or more components and adjusting one or more parameters of welding. As an example, a tilt sensing technique may operate with respect to one or more tilt limits. For example, consider a tilt limit that is not to exceed about several hundred microns as to an axis or axes for purposes of quality control. As an example, a tilt angle may be minimal as an axis of a clamped turbine wheel and an axis of a clamped shaft may be substantially co-axially aligned.

As an example, a method can include applying force to a turbine wheel where, for example, the force is less than approximately 100 N. In such an example, the force may be limited to a force equal to or less than approximately 30 N.

As an example, a system may include position adjustment mechanisms that can adjust laser associated components in a radial and/or an axial direction with respect to an assembly (e.g., or a portion thereof). In such a manner, a focal point, a beam spot, etc. may be adjusted with respect to one or more workpieces such as a turbine wheel and a shaft. For example, a beam spot may be positioned to be centered slightly above a joint (e.g., a seam) such that energy is directed more towards the hub end of the turbine wheel. In such a manner, a weld pool may be formed that includes more material of the turbine wheel than material of the shaft. In such an example, the turbine wheel may be an alloy that includes nickel whereby a weld pool is formed that includes a concentration of nickel that is greater than a 50/50 mix of the alloy and a material of the shaft.

As an example, a system can include a disk laser module that may feed a distribution subsystem. As an example, the disk laser module can include a diode-pumped thin-disk laser operating at about 1030 nm. For example, consider a pumping unit that includes diodes with energy emission at about 941 nm where such energy can be directed to a Yb:YAG disk of the disk laser module.

A thin-disk laser may include an active medium with a thickness of about 200 μm or less. For example, a Yb:YAG active medium is crystalline and can be stimulated on one side via a diode laser stack in a quasi-end-pumped configuration while a another side is cooled. Optics can include a parabolic mirror and a retro-reflective mirror where not-absorbed power can be imaged multiple times, for example, to optimize efficiency. As an example, a single disk may produce up to about 3.5 kilowatts of power, operating in the near-infrared (NIR) at a wavelength of about 1030 nm. As an example, multiple disks may be cascaded to achieve higher power levels. A controller may provide for selection of different laser parameters such as, for example, operational mode, power level, and beam quality. A Yb:YAG disk laser may generate a smaller beam size (e.g., spot size) than a Nd:YAG laser, which, in turn, may allow for high energy density.

As an example, one or more sensors may sense information that may be suitable for detection of a change in power of one or more laser beams (e.g., an indirect detection technique). As an example, a direct technique may be implemented to detect a change in power of one or more laser beams. For example, consider a sensor that senses information associated with a protective window cartridge through which a laser beam passes and/or a power cassette that may be implemented, for example, as an alternative to a protective window.

As to one or more sensors, consider as an example one or more of a temperature sensor, a back reflection sensor, a plasma sensor and a camera (e.g., a CMOS camera, etc.). As an example, a sensor such as a temperature sensor, a back reflection sensor or a plasma sensor may operate at sampling rates of the order of about tens of kilohertz. As an example, a camera sensor may operate at a sampling rate of the order of about a thousand hertz.

As to a power sensor for sensing laser power directly, a welding head can include a protective window cartridge that can provide temperature information from which power of a laser beam may be determined. As an example, a power sensor for sensing laser power directly may include components for laser power calorimetrically. For example, an absorber may be radiated by at least a portion of a laser beam for a defined time period where thermal capacity and temperature rise of the absorber are known. Given such information, laser power can be calculated.

As an example, a laser beam may be characterized, for example, by one or more of beam power, beam diameter and beam position of an unfocussed beam, beam diameter and beam position in the focus and polarization of the beam.

Referring again to FIG. 5 shows an example scenario 501, which includes the laser beam 510-1 and the laser beam 510-2 being directed toward a joint formed by the hub end 340 of the turbine wheel 330 and the turbine wheel shaft end 370 of the shaft 360. The scenario 501 indicates a direction of rotation of the turbine wheel 330 and the shaft 360 and formation of individual weld regions. As illustrated for the beam 510-1, a weld pool may be formed along with one or more plasmas. As an example, a depth of penetration of a beam may be controlled, for example, to control at least in part weld depth. For example, a keyhole depth may be controlled to form a weld between the hub end 340 and the turbine wheel shaft end 370.

As an example, in the scenario 501, a controller may control one or more of position control, rotation control, gas control, temperature control, energy control, focal point control, beam spot size control, plasma control, etc.

Figure 6:
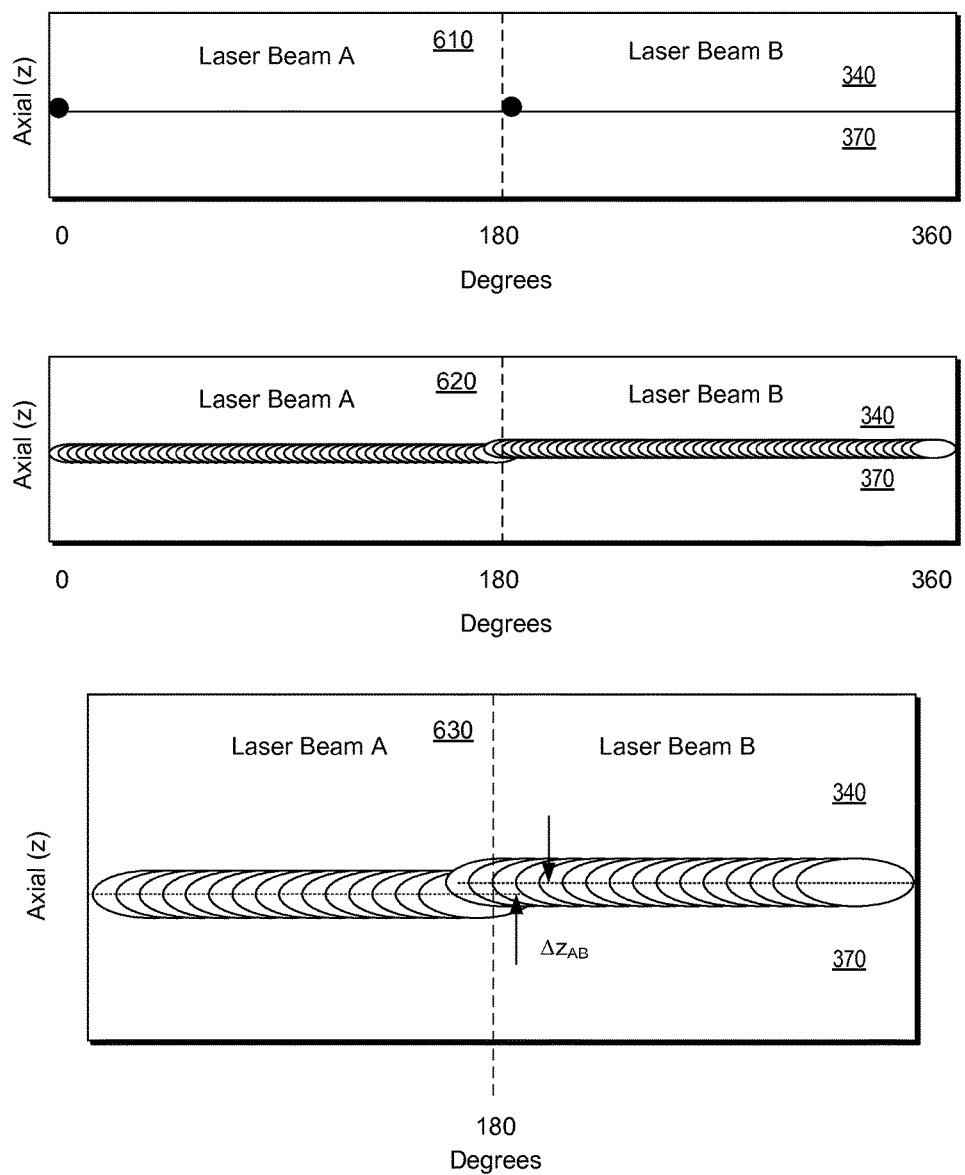
FIG. 6 is a series of diagrams of welds of a unit.

FIG. 6 shows example plots 610, 620 and 630. The plot 610 shows a seam (e.g., a joint) formed by the shaft end 340 of the turbine wheel 330 and the turbine wheel end 370 of the shaft 360. Spots are shown for a laser beam A and a laser beam B where the axial position of the spots differs. As shown, each of the spots is at an axial position that is centered slightly more toward the shaft end 340 than the turbine wheel end 370. For example, where the turbine wheel 330 includes more nickel than the shaft 360, a weld pool may be formed that includes nickel at a concentration greater than a 50/50 mix of the turbine wheel material and the shaft material.

Upon rotation of the turbine wheel 330 and the shaft 360 in unison, a first weld and a second weld may be formed as shown in the plot 620. In an enlarged view, the plot 630 illustrates an axial offset $\Delta z_{AB}$ for the first weld (e.g., of the laser beam A) and the second weld (e.g., of the laser beam B).

In the multi-beam welding scenario 501 of FIG. 5, alignment of the laser beams to each other and to the seam in the workpieces can be controlled. Such control may become more relevant with respect to smaller laser spot sizes. For example, where a laser spot size for each of two or more lasers is less than about 100 microns, alignment can be controlled to align the laser beams to each other and, for example, to one or more of the workpieces as well. As an example, positioning may be within about 10 microns as to workpiece positions and laser beam positioning may be of the order of about 10 microns or less, noting that "exact" alignment is not feasible.

Referring again to the plot 630 of FIG. 6, the axial offset $\Delta z_{AB}$ for the first weld (e.g., of the laser beam A) and the second weld (e.g., of the laser beam B) may be of the order of about 10 microns or less. A unit may be formed by welding of a turbine wheel and a shaft where the unit may include two welds where each of the welds is formed by an individual laser beam.

As an example, a unit may be formed from a turbine wheel and a shaft where run-out associated with a welding process to form the unit is less than about 200 microns. As an example, a force may be applied during the welding process of about 20±10 N to facilitate joint preparation without unduly influencing natural shrinkage around workpieces such that a run-out result is less than approximately 200 microns.

As an example, a unit may exhibit a low level of unbalance after welding, for example, due in part to laser-welding associated run-out being less than about 200 microns.

As an example, a turbine wheel such as the turbine wheel 330 may include a boss hole with a tolerance of about ±0.25 mm at its surface. As an example, such a turbine wheel may include a draft on the hole and a large radius at the base of the hole, which can impacts low-cycle fatigue (LCF) life of the turbine wheel.

As an example, a shaft such as the shaft 360 may include a tolerance of a spigot diameter of about ±0.025 mm. As an example, a clearance of a spigot to a hole may be about 0.47 mm on radius. In such an example, such an arrangement allows for fillet radii and no contact when centered by tooling (e.g., collets).

As an example, a shaft may have an axial tolerance of about ±0.025 mm. As mentioned, beam spot size can impact alignment. For example, a spot size of about R 0.065 mm (e.g., of a laser beam or of an electron beam) may mean that alignment is within about 40 percent of beam diameter as a worst case; however, for a smaller spot size of about R 0.040 mm or less, misalignment may be higher (e.g., about 60 percent to about 100). Energy in a beam tends to be focused in its center, accordingly a method that may include (e.g., unintendedly via misalignment) putting a higher percentage of energy in one material versus another material (e.g., possibly 80 percent to about 100 percent) may impact metallurgical properties of a weld pool.

As an example, a beam spot (e.g., cross-section orthogonal to beam axis) may include a shape such as, for example, a Gaussian shape. Such a beam may include a spot size defined by a diameter or by a radius (e.g., "R"). A beam may include a beam waist along a beam axis, which may be a minimum spot size. As an example, where a beam contacts a component, the spot size may be defined where contact occurs. For example, a beam may include a beam waist that may be offset from where the beam contacts an object (e.g., or objects). As an example, for a beam propagating in free space, a spot size radius may be defined as w(z) where the following equation may define variation of spot size along the beam axis: $w(z)=w_0(1+(z/z_R)^2)^{0.5}$. In such an example, $z_R$ may be the Rayleigh range (e.g., $\pi w_0^2/\lambda$). As an example, a depth of focus may be defined as $b=2z_R$. As an example, where an offset exists between a waist center (e.g., minimum spot size at $w_0$) and a contact surface (e.g., upon initiation of welding), the offset may be within the depth of focus. As an example, during welding, a beam may penetrate to a depth beyond that of an initial contact surface.

As an example, a welding process can include aligning two or more beams to a seam before welding. In such an example, an intended axial offset from a seam may be imparted such that energy is more directed to a turbine wheel than a shaft (e.g., in a range of about 50 percent to about 80 percent). As an example, a welding process may operate within multiple beams that are aligned axially within a limit or limits, for example, to maintain weld pool compositions for each weld portion within a limit or limits. Such an approach may act to maintain metallurgical properties of multiple weld pools within one or more property ranges. As an example, for a process that employs multiple beams, an axial offset limit for multiple beams may be, for example, less than about 0.1 millimeter.

As an example, a shaft may include a piloting spigot and a turbine wheel may include a piloting bore. As an example, a shaft may be without a piloting spigot and a turbine wheel may be without a piloting bore.

As an example, a unit for a turbocharger can include a turbine wheel portion that includes a turbine wheel material and a turbine wheel axis; a shaft portion that includes a shaft material and a shaft axis; a first weld that includes a first average axial position over a first azimuthal span and first weld composition formed of a greater proportion of the turbine wheel material than the shaft material; and a second weld that includes a second average axial position over a second azimuthal span and second weld composition formed of a greater proportion of the turbine wheel material than the shaft material, where, for example, a sum of the first azimuthal span and the second azimuthal span is approximately 360 degrees, where, for example, the first average axial position differs from the second average axial position, and where, for example, the first weld composition differs from the second weld composition.

Figure 7:
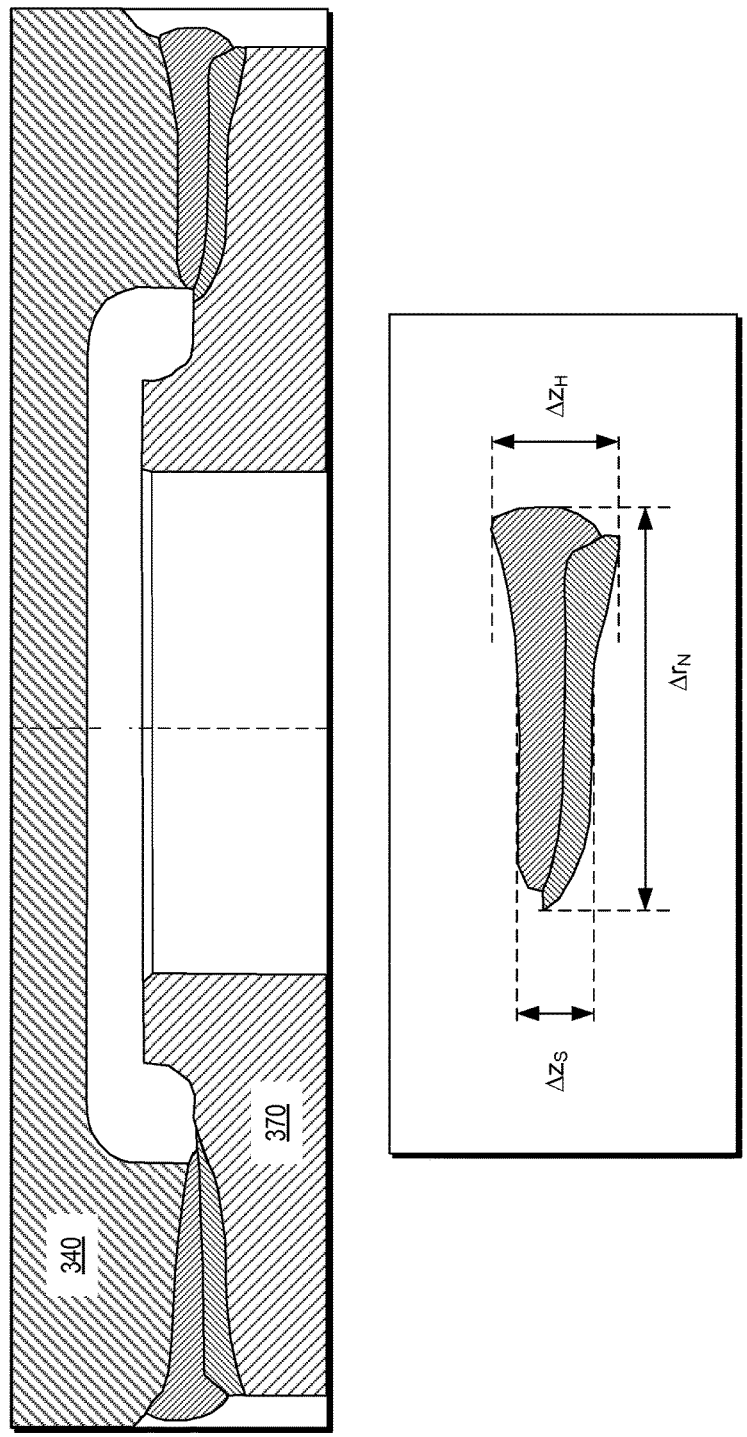
FIG. 7 is a diagram of a cross-sectional view of a unit.

FIG. 7 shows an approximate cross-sectional view of a unit formed using two laser beams. As indicated, the weld to the right differs from the weld to the left. Each of the welds may be characterized by one or more features, including, for example, dimensions, compositions, surface characteristics, porosities, etc.

As shown, a weld may be defined by one or more dimensions. For example, a weld may have a nail shape in a cross-sectional view that includes a nail length dimension ($\Delta r_N$), a nail head dimension ($\Delta z_H$) and a nail shank dimension ($\Delta z_S$). As an example, a nail head dimension may be about a mm or less and a nail shank dimension may be about 0.4 mm or less.

Figure 8:
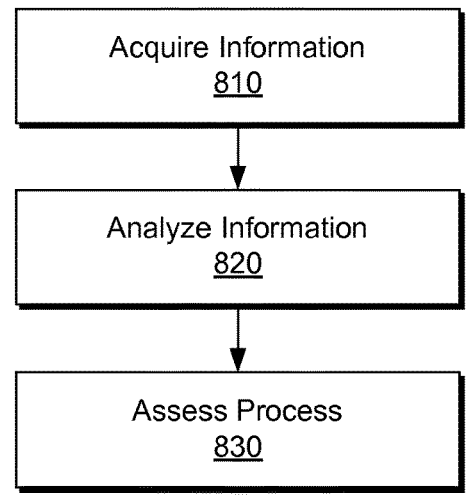
FIG. 8 is a diagram of an example of a method.
Figure 8:
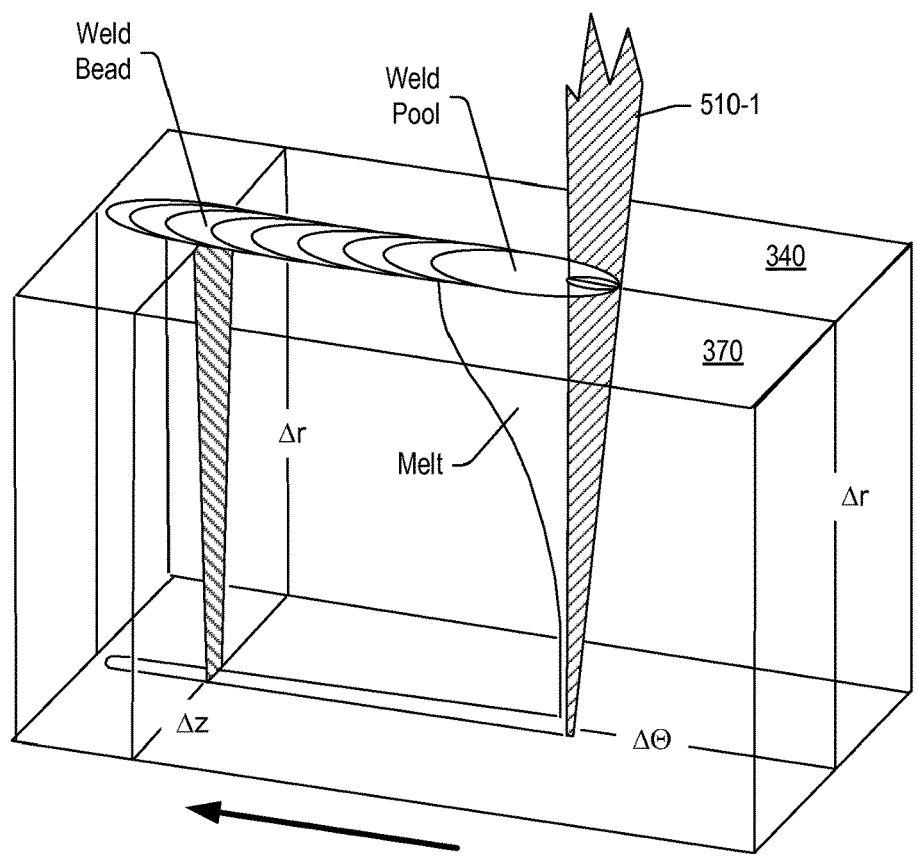

FIG. 8 shows an example of a method 800 that may occur prior to, during and/or after a welding process (e.g., or welding processes). As shown, the method 800 includes an acquisition block 810 for acquiring information, an analysis block 820 for analyzing at least a portion of the information, and an assessment block 830 for assessing one or more processes based at least in part on the analyzing.

FIG. 8 also shows a diagram of components being welded where the components may be the hub end 340 of the turbine wheel 330 and the turbine wheel end 370 of the shaft 360. As shown, a laser beam 510-1 may form a melt with a weld pool visible at the surface of the components; noting that the components may be moving in a direction as indicated by an arrow while the laser beam 510-1 may be relatively stationary (e.g., via aiming of a beam spot). Ahead of the laser beam 510-1, a seam exists (e.g., a joint), as defined by the two components while, behind the laser beam 510-1, a weld bead is formed. As mentioned, a beam spot of a laser beam may be aimed at a seam or slightly off a seam (e.g., with a center more toward one component than another component). As indicated via cross-sectional views (see the plane with an axial dimension $\Delta z$ and the plane with an azimuthal dimension $\Delta\Theta$), the weld bead is a surface portion of the weld that extends downwardly from the surface. Information as to, for example, the shape, size, etc. of the weld bead may be analyzed to assess a welding process.

As an example, the acquisition block 810 may include acquiring information via a laser-based sensor. For example, consider a laser-based sensor that triangulates a seam, a weld bead, etc. As an example, an analysis of information may output information as to roughness, concavity, radius percentage, etc. As an example, an analysis may output information as to a profile or profiles. For example, consider information as to a seam profile, a weld bead profile, a weld pool profile, etc. As an example, one or more process-related parameters may be adjusted, selected, etc. based at least in part on information from an analysis or analyses.

As an example, a beam or beams may be adjusted based at least in part on image analysis. For example, beam energy, beam focal length, beam spot size, etc. may be adjusted based on image analysis (e.g., based on one or more of joint clearance, contact, alignment, etc.).

As an example, a method can include seam tracking. As an example, a method can include gap detection. As an example, a method can include detecting a seam position by finding a point on a component (e.g., a shaft or a turbine wheel) where the point may be a point that contacts another component (e.g., a turbine wheel or a shaft). As an example, a "set-up" may be accepted or rejected. As an example, a rejected "set-up" may be adjusted to reposition one or more components. For example, adjusting may include rotating one component while maintaining another component stationary. As another example, adjusting may include rotating two components to different extents (e.g., one clockwise and the other counter-clockwise).

As an example, a method can include locating a shaft plane prior to contacting the shaft with a turbine wheel. In such an example, the locating can include probing, for example, with a contact probe, a non-contact probe or a contact probe and a non-contact probe. As an example, a non-contact probe may be laser-based. As an example, a method can include comparing a probed position (e.g., as identified by probing) to a reference position (e.g., a position of a reference surface, etc.). As an example, probing may be part of a positioning method that positions components with respect to each other for purposes of welding via one or more laser beams, which may have relatively small spot size(s). As an example, probing may provide for position accuracy less than about 20 microns.

Figure 9:
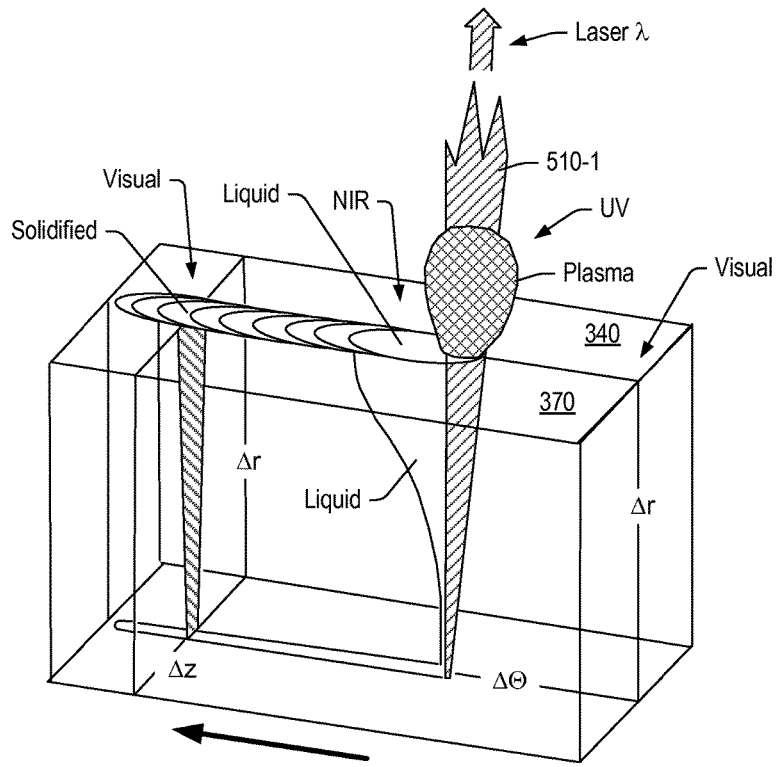
FIG. 9 is a table and a diagram of examples of sensors and sensor information.

FIG. 9 shows a table 910 listing examples of sensors and sensor information and a diagram of a weld being formed by a laser 510-1 to weld a component 340 to a component 370. The table 910 lists a plasma or metal plume sensor, a temperature sensor, a back reflection sensor and a visible light sensor. The table 910 further lists examples of wavelengths of energy that may be sensed by one or more of the sensors. For example, the plasma or metal plume sensor may include circuitry to sense UV energy (e.g., less than about 600 nm), the temperature sensor may include circuitry to sense NIR energy (e.g., from about 1100 nm to about 1800 nm), the back reflection sensor may include circuitry to sense energy associated with a laser (e.g., consider a Yb:YAG laser, etc.), and the visible energy sensor may include circuitry to sense visible light energy (e.g., about 390 nm to about 700 nm). As shown in the table 910, information from a plasma or metal plume sensor may pertain to laser power, focus position of a laser beam, gas protection, seam position, welding gap widening, etc.; information from a temperature sensor may pertain to changes in heat dissipation or conduction, for example, due to one or more weld faults (e.g., consider porosity, under penetration, etc.); information from a back reflection sensor may pertain to one or more keyhole characteristics (e.g., welding penetration depth, splatters, etc.); and information from a visible light sensor may pertain to a size, a shape, a surface, a seam, etc. (e.g., consider characteristics of post- and pre-weld regions).

As an example, a system may include one or more sensors that can sense information prior to welding, during welding and/or after welding. As an example, a system may sense information via one or more sensors and analyze at least a portion of the sensed information as to quality of a weld and/or one or more components (e.g., physical characteristics, position, etc.). As an example, a system may analyze information by determining one or more deviations from reference information. For example, a system may include a reference signal that can be compared to a sensed signal. As an example, a system may analyze sensed information in real-time, for example, to determine whether a weld defect has occurred. As an example, a system may acquire a signal and analyze at least a part of that signal versus a reference signal to determine whether a welding defect has occurred.

As an example, a shaft and wheel assembly may include features such as those of the turbine wheel 330 and the shaft 360 of FIG. 3 and/or other features. As an example, a shaft and wheel assembly may include a component that includes a reservoir feature. For example, a reservoir feature may provide for catching molten material generated during a welding process (e.g., consider trapping a weld "tongue"). For example, a weld may penetrate a radial depth where an end of the weld may be considered a "tongue" with a tip, which may extend into a reservoir. As an example, a penetration depth may be about a millimeter to a few millimeters where molten material of a tongue may spill into a reservoir.

FIG. 10 shows an example of a portion of a shaft and wheel assembly (SWA) 1000 that includes a shaft 1020 and a turbine wheel 1070. The shaft 1020 includes a turbine wheel end 1022, annular grooves 1025-1 and 1025-2, shoulders 1027 and 1029 and a reservoir 1045. The reservoir 1045 has an annular shape with an inner edge and an outer edge where the reservoir 1045 is open to a cavity at its inner edge. The reservoir 1045 includes an axial depth $\Delta z_r$. The volume of the reservoir 1045 may be determined based on a radius or diameter of its inner edge, a radius or diameter of its outer edge and its axial depth.

FIG. 10 shows additional examples of reservoir profiles 1001 and 1003. The example profile 1001 includes a semi-teardrop shape, for example, where a maximum depth of the profile 1001 is closer to the outer edge of the reservoir than the inner edge of the reservoir. As shown, the profile may be smooth, for example, curved. As an example, a reservoir may include a piriform profile (e.g., $x=a*(1+\sin t)$; $y=b*\cos t(1+\sin t)$, for t within 0 degrees to 180 degrees), for example, a semi-piriform profile. As an example, a reservoir may include a pear-shaped profile (e.g., $b^2*y^2=x^3*(a-x)$), for example, a semi-pear-shaped profile. As to a teardrop profile, consider the parameteric equations $x=\cos t$; $y=\sin t*\sin^m (0.5*t)$ where m may be in a range from about 0 to about 7. As an example, a reservoir may include a profile of a portion of a dumbbell curve (e.g., $a^4*y^2=x^4*(a^2-x^2)$). As shown in FIG. 10, the reservoir profile 1003 includes lines and corners formed by intersections of two lines. The reservoir profile 1003 includes a level floor portion at a maximum depth that extends to the inner edge via a line with a slope. As an example, a reservoir profile may include lines and curves.

FIG. 11 shows an example of a portion of a shaft and wheel assembly (SWA) 1100 that includes a shaft 1120 and a turbine wheel 1170. The shaft 1120 includes a turbine wheel end 1122, a side wall 1125 (e.g., disposed at a radius), shoulders 1127 and 1129 and a reservoir 1145. The reservoir 1145 has an annular shape with an inner edge and an outer edge where the reservoir 1145 is open to a cavity at its inner edge. The reservoir 1145 includes an axial depth $\Delta z_r$. The volume of the reservoir 1145 may be determined based on a radius or diameter of its inner edge, a radius or diameter of its outer edge and its axial depth.

FIG. 11 shows additional examples of reservoir profiles 1101 and 1103. The example profile 1101 includes a semi-teardrop shape, for example, where a maximum depth of the profile 1101 is closer to the outer edge of the reservoir than the inner edge of the reservoir. As shown, the profile may be smooth, for example, curved. As an example, a reservoir may include a piriform profile (e.g., $x=a*(1+\sin t)$; $y=b"\cos t(1+\sin t)$, for t within 0 degrees to 180 degrees), for example, a semi-piriform profile. As an example, a reservoir may include a pear-shaped profile (e.g., $b^2*y^2=x^3*(a-x)$), for example, a semi-pear-shaped profile. As to a teardrop profile, consider the parameteric equations $x=\cos t$; $y=\sin t*\sin^m (0.5*t)$ where m may be in a range from about 0 to about 7. As an example, a reservoir may include a profile of a portion of a dumbbell curve (e.g., $a^4*y^2=x^4*(a^2-x^2)$). As shown in FIG. 11, the reservoir profile 1103 includes lines and corners formed by intersections of two lines. The reservoir profile 1103 includes a level floor portion at a maximum depth that extends to the inner edge via a line with a slope. As an example, a reservoir profile may include lines and curves.

As an example, a material may include molybdenum. As an example, upon heating of such a material, molybdenum may form an oxide such as, for example, molybdenum trioxide ($MoO_3$). Molybdenum trioxide can have a melting point of about 795 degrees C. (e.g., about 1,463 degrees F.). As an example, an alloy such as AISI 4140 may have a melting point of about 1416 degrees C. (e.g., about 2,580 degrees F.). During a welding process, some amount of molybdenum oxide may form, which has a melting point less than that of bulk material. In such an example, upon cooling, one or more regions of molybdenum oxide may remain in a molten (e.g., liquid) state longer than surrounding material.

As an example, the alloy AISI 4140 can include:

| Element | Content (percent) |
| --- | --- |
| Iron, Fe | 96.785-97.77 |
| Chromium, Cr | 0.80-1.10 |
| Manganese, Mn | 0.75-1.0 |
| Carbon, C | 0.380-0.430 |
| Silicon, Si | 0.15-0.30 |
| Molybdenum, Mo | 0.15-0.25 |
| Sulfur, S | 0.040 |
| Phosphorous, P | 0.035 |

In such an example, the amount of molybdenum oxide formed during a welding process may be minimal. As an example, where components are welded via one or more laser beams, a low molybdenum alloy may be employed for one or both of the components. As an example, a low molybdenum alloy may be one that has a molybdenum content less than one percent by weight. As an example, a low molybdenum alloy may be on that has a molybdenum content less than approximately 0.5 percent by weight. As an example, a low molybdenum alloy may include a molybdenum content by weight greater than about 0.1 percent and less than about 0.5 percent.

Molybdenum may be included at higher levels than about two percent in an alloy for various reasons, for example, as to resistance to pitting (e.g., responsive to chloride, pH, etc.). As an example, where molybdenum content is about two to three percent, an alloy may exhibit anti-pitting qualities over a range of pH values with a chloride concentration at about 10 ppm or less (e.g., consider temperatures of about 65 to 80 degrees C.; about 150 to 180 degrees F.). As an example, molybdenum may impart a more uniform hardness and strength.

The table below shows some examples of alloys and their respective levels of molybdenum.

| Molybdenum Content | Alloy |
| --- | --- |
| 0 | Types 301, 302, 303, 304, 304L, 304LN, 305, 308, 309, 310, 321, 347 |
| ~0.08 to ~0.15 | AISI 4118 |
| ~0.13 to ~0.20 | AISI 4120 |
| ~0.15 to ~0.25 | AISI 4140 |
| ~0.20 to ~0.30 | AISI 4121 |
| ~0.25 to ~0.35 | AISI 4161 |
| 0.8 to 1.2 | X22CrMoV12-1 |
| 2 | Types 316, 316L, 329 |
| 3 | Types 317, 317L |
| 3.5 | Alloy 825 |
| 4 | Alloy 904L, types 317LM, 317LMN |
| 6 | AL-6XN, 25-6Mo, 254SMO, Alloy G, Alloy 3-G |
| 9 | Alloy 625 |

SAE standards classify a molybdenum steel generally as 4XXX.

Carbon and alloy steel grades can include, for example, 41XX, which are chromium-molybdenum (chromoly) steels. As an example, a 41XX material may include Cr 0.50, 0.80 or 0.95; and Mo 0.12, 0.20, 0.25, or 0.30. As an example, a nickel-chromium-molybdenum steel may include a Mo content less than about 0.5. As an example, a nickel-molybdenum steel may include a Mo content less than about 0.5. As an example, a molybdenum steel may include a Mo content less than about 0.5 (e.g., 40XX and 44XX).

As an example, a low molybdenum alloy may exhibit less hot cracking. Hot cracking is a condition that may occur due to stress and one or more strain intolerant microstructures. Stress occurs during welding due to thermal stresses, particularly during solidification. Strain intolerant microstructures may temporarily occur at elevated temperatures near the melting and solidification point of an alloy. As an example, a shape of a weld pool (e.g., tear-drop shaped weld pool) may have an effect on hot cracking. Molybdenum may be included at higher levels in an alloy for various reasons, for example, as to resistance to pitting.

As an example, a method can include joining of a Ni-based superalloy turbine wheel to a low-alloy steel shaft to form a shaft and wheel assembly (SWA) as a unit where joining includes welding with one or more laser beams. For example, consider a SWA suited for an exhaust gas turbocharger operatively coupled to an internal combustion engine (e.g., diesel, gasoline, flex-fuel, bi-fuel, etc.). As an example, the shaft may be a low-alloy steel shaft with a molybdenum content less than about 0.5 percent and, for example, greater than about 0.01 percent. In such an example, joining by welding may result in a weld with low distortion and low residual stresses, which may be relatively free of cracks or defects.

As to forming a weld or welds using one or more laser beams (e.g., fiber or disk), a spot size may be less than about 0.1 millimeters. Where such a spot size is used, along with a low-alloy steel shaft material, such as AISI 4140 (e.g., having a low molybdenum content, which is less than about 0.5 percent), risk of hot cracking may be reduced (e.g., substantially avoided). For example, a weld may be formed that is substantially free of detrimental hot cracking.

As mentioned, molybdenum may form a metal oxide (e.g., $MoO_3$), which may have a relatively low melting point and remain liquid longer during weld pool solidification. In such an example, liquid in interdendritic regions of the weld pool that may include such a metal oxide may, during solidification, allow for formation of microcracks. Where welding utilizes a spot size below about 0.1 millimeter, energy input may be reduced, which, in turn, can reduce distortion and residual stress. As an example, as part of a production process, laser welding may be faster than electron beam welding because electron beam welding involves pulling a vacuum (e.g., a joint of components to be welded are in a vacuum). As an example, multiple laser beams may be used, for example, via multiple units or via splitting. As an example, one or more laser beams may allow for tack welding and/or full welding (e.g., optionally simultaneously). As an example, welding or tacking with two or more beams simultaneously result in welds with low initial unbalance and symmetric residual stresses.

As an example, a production process that produces wheels welded by one or more laser beams may have low initial unbalance, which can improve throughput on balancing equipment, and they may have low residual stress, which can prevent degradation of balance values after time in service. As an example, a weld may be formed to produce a unit that may be used in a production turbocharger with being subject to a weld stress relief process.

As an example, a method may include welding using a laser beam that includes a spot size of about 0.1 mm or optionally less (e.g., to about 0.05 mm). As an example, a weld pool size may be associated with a spot size. As an example, a larger spot size may result in larger weld pool and wider heat affected zone (HAZ) with more distortion and residual stress, which may, to meet specification, require a secondary stress-relief operation. As an example, a spot size used for welding may be approximated, for example, by measuring a size of a weld pool and a size of a HAZ.

As an example, a weld may include a nail shape where a nail shaped head portion has a dimension of about 1 mm or less and where a nail shaped shank portion has a lesser dimension of about 0.4 mm or less.

As an example, a unit for a turbocharger can include a turbine wheel portion that includes a turbine wheel material and a turbine wheel axis; a shaft portion that includes a shaft material and a shaft axis; a first weld that includes a first average axial position over a first azimuthal span and first weld composition formed of a greater proportion of the turbine wheel material than the shaft material; and a second weld that includes a second average axial position over a second azimuthal span and second weld composition formed of a greater proportion of the turbine wheel material than the shaft material, where a sum of the first azimuthal span and the second azimuthal span is approximately 360 degrees, where the first average axial position differs from the second average axial position, and where the first weld composition differs from the second weld composition. In such an example, the first weld can include a first axial width of a shank portion of approximately 0.4 mm or less and the second weld can include a second axial width of a shank portion of approximately 0.4 mm or less. As an example, a unit can include a run-out of less than about 200 microns.

As an example, turbine wheel material can include nickel. As an example, a turbine wheel portion of a SWA unit can include a bore, which may be, for example, a piloting bore. As an example, a shaft of a SWA unit can include a spigot, which may be, for example, a piloting spigot. As an example, a radial clearance can exist between a piloting spigot and a piloting bore. As an example, a SWA unit may include a shaft that is without a piloting spigot and a turbine wheel that is without a piloting bore.

As an example, a turbocharger can include a compressor housing; a center housing; a turbine housing; and a unit that includes a turbine wheel portion that includes a turbine wheel material and a turbine wheel axis; a shaft portion that includes a shaft material and a shaft axis; a first weld that includes a first average axial position over a first azimuthal span and first weld composition formed of a greater proportion of the turbine wheel material than the shaft material; and a second weld that includes a second average axial position over a second azimuthal span and second weld composition formed of a greater proportion of the turbine wheel material than the shaft material, where a sum of the first azimuthal span and the second azimuthal span is approximately 360 degrees, where the first average axial position differs from the second average axial position, and where the first weld composition differs from the second weld composition.

As an example, a unit for a turbocharger can include a turbine wheel portion that includes a turbine wheel material and a turbine wheel axis; a shaft portion that includes a shaft material and a shaft axis where the shaft material includes a molybdenum content less than 0.5 percent by weight; and a weld that includes a nail shape in cross-section where a head portion of the nail shape includes an axial dimension of approximately 1 mm or less and where a shank portion of the nail shape includes an axial dimension of approximately 0.4 mm or less. In such an example, the weld can include a weld composition formed of a greater proportion of the turbine wheel material than the shaft material.

As an example, a shaft material may be an AISI 41XX material. As an example, a shaft material may be an AISI 4140 material.

As an example, a nail shape of a weld can include a tip portion (e.g., a tongue tip) and a shaft portion can include a reservoir that receives the tip portion.

As an example, a turbine wheel material can include nickel. As an example, a turbine wheel material may be a superalloy. As an example, a turbine wheel material may be an austenitic nickel-chromium-based superalloy.

As an example, a turbine wheel portion of a SWA unit can include a bore, which may be, for example, a piloting bore. As an example, a shaft of a SWA unit can include a spigot, which may be, for example, a piloting spigot. As an example, a radial clearance can exist between a piloting spigot and a piloting bore. As an example, a SWA unit may include a shaft that is without a piloting spigot and a turbine wheel that is without a piloting bore.

As an example, a unit for a turbocharger can include a turbine wheel portion that includes a turbine wheel material and a turbine wheel axis; a shaft portion that includes a shaft material and a shaft axis where the shaft material includes a molybdenum content less than 0.5 percent by weight; a first weld that includes a first average axial position over a first azimuthal span; and a second weld that includes a second average axial position over a second azimuthal span, where a sum of the first azimuthal span and the second azimuthal span is approximately 360 degrees, and where the first average axial position differs from the second average axial position. In such an example, the first weld can include a nail shape in cross-section where a head portion of the nail shape includes an axial dimension of approximately 1 mm or less and where a shank portion of the nail shape includes an axial dimension of approximately 0.4 mm or less. As an example, the second weld can include a nail shape in cross-section where a head portion of the nail shape includes an axial dimension of approximately 1 mm or less and where a shank portion of the nail shape includes an axial dimension of approximately 0.4 mm or less. As an example, the first weld and the second weld can include respective nail shapes in cross-section where a head portion of each respective nail shape includes an axial dimension of approximately 1 mm or less and where a shank portion of each respective nail shape includes an axial dimension of approximately 0.4 mm or less.

As an example, a first weld and a second weld can include weld compositions formed of a greater proportion of a turbine wheel material than a shaft material. In such an example, the shaft material may be an AISI 41XX material such as, for example, an AISI 4140 material. As an example, a turbine wheel material can include nickel. As an example, a turbine wheel material may be a superalloy. As an example, a turbine wheel material may be an austenitic nickel-chromium-based superalloy.

As an example, a turbocharger can include a compressor housing; a center housing; a turbine housing; and a unit that includes a turbine wheel portion that includes a turbine wheel material and a turbine wheel axis; a shaft portion that includes a shaft material and a shaft axis where the shaft material includes a molybdenum content less than 0.5 percent by weight; a first weld that includes a first average axial position over a first azimuthal span; and a second weld that includes a second average axial position over a second azimuthal span, where a sum of the first azimuthal span and the second azimuthal span is approximately 360 degrees, and where the first average axial position differs from the second average axial position.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A unit for a turbocharger, the unit comprising:
a turbine wheel portion that comprises a turbine wheel material and a turbine wheel axis;
a shaft portion that comprises a shaft material and a shaft axis;
a first weld that comprises a first average axial position over a first azimuthal span and a first weld composition formed of a greater proportion of the turbine wheel material than the shaft material; and
a second weld that comprises a second average axial position over a second azimuthal span and a second weld composition formed of a greater proportion of the turbine wheel material than the shaft material,
wherein a sum of the first azimuthal span and the second azimuthal span is approximately 360 degrees,
wherein the first average axial position differs from the second average axial position, and
wherein the first weld composition differs from the second weld composition.

2. The unit of claim 1 wherein the first weld comprises a first axial width of a shank portion of 0.4 mm or less and wherein the second weld comprises a second axial width of a shank portion of 0.4 mm or less.

3. The unit of claim 1 comprising a run-out of less than 200 microns.

4. The unit of claim 1 wherein the turbine wheel material comprises nickel.

5. The unit of claim 1 wherein the turbine wheel portion comprises a bore.

6. The unit of claim 1 wherein the shaft portion comprises a spigot.

7. The unit of claim 1 wherein the shaft portion comprises a piloting spigot and the turbine wheel portion comprises a piloting bore.

8. The unit of claim 7 wherein a radial clearance exists between the piloting spigot and the piloting bore.

9. The unit of claim 1 wherein the shaft portion is without a piloting spigot and the turbine wheel portion is without a piloting bore.

10. The unit of claim 1 wherein the first azimuthal span is approximately 180 degrees and wherein the second azimuthal span is approximately 180 degrees.

11. A turbocharger comprising:
  a compressor housing;
  a center housing;
  a turbine housing; and
  a unit that comprises
    a turbine wheel portion that comprises a turbine wheel material and a turbine wheel axis;
    a shaft portion that comprises a shaft material and a shaft axis;
    a first weld that comprises a first average axial position over a first azimuthal span and a first weld composition formed of a greater proportion of the turbine wheel material than the shaft material; and
    a second weld that comprises a second average axial position over a second azimuthal span and a second weld composition formed of a greater proportion of the turbine wheel material than the shaft material,
  wherein a sum of the first azimuthal span and the second azimuthal span is approximately 360 degrees, wherein the first average axial position differs from the second average axial position, and
  wherein the first weld composition differs from the second weld composition.

12. The turbocharger of claim 11 wherein the first weld comprises a first axial width of a shank portion of 0.4 mm or less and wherein the second weld comprises a second axial width of a shank portion of 0.4 mm or less.

13. The turbocharger of claim 11 wherein the unit comprises a run-out of less than 200 microns.

14. The turbocharger of claim 11 wherein the turbine wheel material comprises nickel.

15. The turbocharger of claim 11 wherein the turbine wheel portion comprises a bore.

16. The turbocharger of claim 11 wherein the shaft portion comprises a spigot.

17. The turbocharger of claim 11 wherein the shaft portion comprises a piloting spigot and the turbine wheel portion comprises a piloting bore.

18. The turbocharger of claim 17 wherein a radial clearance exists between the piloting spigot and the piloting bore.

19. The turbocharger of claim 11 wherein the shaft portion is without a piloting spigot and the turbine wheel portion is without a piloting bore.

20. The turbocharger of claim 11 wherein the first azimuthal span is approximately 180 degrees and wherein the second azimuthal span is approximately 180 degrees.

* * * * *